US 7,920,885 B2

(12) United States Patent
Singh et al.

(10) Patent No.: US 7,920,885 B2
(45) Date of Patent: Apr. 5, 2011

(54) METHOD AND SYSTEM FOR ESTABLISHING A CONNECTION ON A SECONDARY FREQUENCY CHANNEL FOR WIRELESS COMMUNICATION

(75) Inventors: Harkirat Singh, Santa Clara, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 791 days.

(21) Appl. No.: 11/801,613

(22) Filed: May 10, 2007

(65) Prior Publication Data

US 2007/0268862 A1 Nov. 22, 2007

Related U.S. Application Data

(60) Provisional application No. 60/801,765, filed on May 18, 2006.

(51) Int. Cl.
*H04B 7/00* (2006.01)
(52) U.S. Cl. ....... 455/517; 455/444; 455/445; 455/41.2; 370/332; 370/333; 709/212; 709/218
(58) Field of Classification Search ....... 455/444–452.2, 455/41.1, 41.2; 370/332, 333, 395.64, 400–418, 370/445–448; 709/212, 218, 226, 227–229, 709/230–235, 238–239, 252
See application file for complete search history.

(56) References Cited

OTHER PUBLICATIONS

Maruhashi, K. et al., "Wireless Uncompressed-HDTV-Signal Transmission System Utilizing Compact 60-GHz-band Transmitter and Receiver," System Devices Research Laboratories, NEC Corporation, Jun. 2005, pp. 1867-1870, Microwave Symposium Digest, 2005 IEEE MTT-S International, Japan.
IEEE Computer Society, "Draft Standard Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPANs)," IEEE Draft P802.15.3/D16, Feb. 2003, pp. 1-362.
LAN/MAN Committee of the IEEE Computer Society, "IEEE Standard for Information technology-Telecommunications and information exchange between systems-Local and metropolitan area networks-Specific requirements, Part 11: Wireless LAN Medium Access Control (MAC) and Physical Layer (PHY) specifications: Amendment: Medium Access Control (MAC) Quality of Service (QoS) Enhancements," Amendment to ANSI/IEEE Std 802.11TM-1999, IEEE P802.11e/D13.0, Jan. 2005, pp. 1-198, The Institute of Electrical and Electronics Engineers, Inc., New York, NY.
Multiband OFDM Alliance, et al., "Distributed Medium Access Control (MAC) for Wireless Networks," Nov. 1, 2005, pp. 1-182, Version 0.99, MBOA-SIG.

*Primary Examiner* — Edward Urban
*Assistant Examiner* — Fayyaz Alam
(74) *Attorney, Agent, or Firm* — Kenneth L. Sherman, Esq.; Michael Zarrabian, Esq.; Myers Andras Sherman & Zarrabian LLP

(57) ABSTRACT

A method and system for establishing a subnet in a wireless network is provided for wireless transmission of information between two stations in the network. A subnet access process in a wireless communication system establishes a subnet comprising a direct wireless link on a secondary frequency channel for wireless transmission of data between two stations.

33 Claims, 11 Drawing Sheets

100

Stations A and B exchange directional data on a secondary channel

Stations A and B establish direct link on a secondary channel

400

METHOD AND SYSTEM FOR ESTABLISHING A CONNECTION ON A SECONDARY FREQUENCY CHANNEL FOR WIRELESS COMMUNICATION

RELATED APPLICATION

This application claims priority from U.S. Provisional Patent Application Ser. No. 60/801,765, filed on May 18, 2006, incorporated herein by reference.

FIELD OF THE INVENTION

The present invention relates to wireless communication, and in particular, to communication of video information over a wireless communication medium.

BACKGROUND OF THE INVENTION

With the proliferation of high quality video, an increasing number of electronics devices (e.g., consumer electronics devices) utilize high definition (HD) video signals. Conventionally, most systems compress the HD signal, which can be around multi-Mbps (megabits per second) in bandwidth, to a fraction of its size to allow for efficient transmission between devices. However, with each compression and subsequent decompression of the signal, some video information can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD signals between devices.

Wireless local area network (WLAN) and similar technologies can suffer interference issues when several devices are connected and they do not have the bandwidth to carry the uncompressed HD signal by providing an air interface to transmit uncompressed video. Referring to FIG. 1, the IEEE 802.11e draft (IEEE P802.11e/D13.0 (January 2005), "Amendment: Medium Access Control (MAC) Quality of Service (QoS) Enhancements"), provides a 4-step process for a Direct Link Protocol (DLP) which is used to set up a peer-to-peer link between two stations in a WLAN. This allows video frame transmission between two stations (STAs) without going through a coordinator. However, the direct link is established on the same channel that an access point (AP) utilizes for communication. This reduces available bandwidth for video frame transmissions between two stations. There is, therefore, a need for a method and system for communication of video information between two stations in a network, which address the above shortcomings.

BRIEF SUMMARY OF THE INVENTION

A method and system for establishing a subnet in a wireless network is provided for wireless transmission of information between two stations in the network. A subnet access process in a wireless communication system establishes a subnet comprising a direct wireless link on a secondary frequency channel for wireless transmission of data between two stations.

In one implementation, the subnet access process includes the steps of: receiving a request for wireless communication between two wireless stations over a primary frequency channel; establishing a direct wireless communication link between the two stations over a secondary frequency channel; and performing wireless communication between the two stations over the direct communication link via the secondary frequency channel.

The step of establishing the direct communication link between the two stations further includes the steps of: determining if the primary frequency channel has sufficient bandwidth to satisfy the communication request; and if the primary frequency channel has insufficient bandwidth to satisfy the communication request, then establishing the direct communication link between the two stations over the secondary frequency channel.

For establishing the direct communication link between the two stations, the two stations perform remote channel scans and provide the scan results by a remote scan response command. The scan results include information about the channels scanned, and the quality of each scanned channel.

Based on the remote channel scans, a common frequency set is determined. Then, a frequency channel is selected from the common frequency set as the secondary frequency channel. Selecting a frequency channel from the common frequency set as the secondary frequency channel can include the steps of selecting a frequency channel with the highest quality in the common frequency set.

The requesting stations perform communication therebetween with directed peer-to-peer data exchange over the direct communication link via the secondary frequency channel. One or both of the requesting stations can further periodically broadcast NULL frames for fixed duration on the secondary frequency channel to prevent other stations from transmitting on the secondary frequency channel. Further, an AP or coordinator on the primary frequency channel can transmit duplicates of a primary frequency channel beacon on the second frequency channel to prevent other stations from transmitting on the secondary frequency channel.

Upon completion of communications between the two stations, the requesting stations switch back to communication on the primary frequency channel, and the direct link on the secondary frequency channel is ended.

These and other features, aspects and advantages of the present invention will become understood with reference to the following description, appended claims and accompanying figures.

DETAILED DESCRIPTION OF THE INVENTION

The present invention provides a method and system for establishing a subnet in a wireless network for wireless transmission of information such as video information between two stations in the network. In one embodiment, this involves implementing a subnet access method in a wireless communication system for establishing a subnet, comprising a direct wireless link on a secondary frequency channel for wireless transmission of data (e.g., uncompressed video signals) between two stations. In one example, if due to insufficient available bandwidth on a primary frequency channel a transmission request between a pair of stations cannot be satisfied, then a subnet access controller establishes a subnet (or a direct link) on a secondary frequency channel so that said pair of stations can access the secondary channel for communication therebetween.

An implementation of a subnet access process according to the present invention for establishing a direct link or subnet on a secondary frequency channel for wireless transmission of uncompressed high definition television (HDTV) signals is now described.

Figure 1:
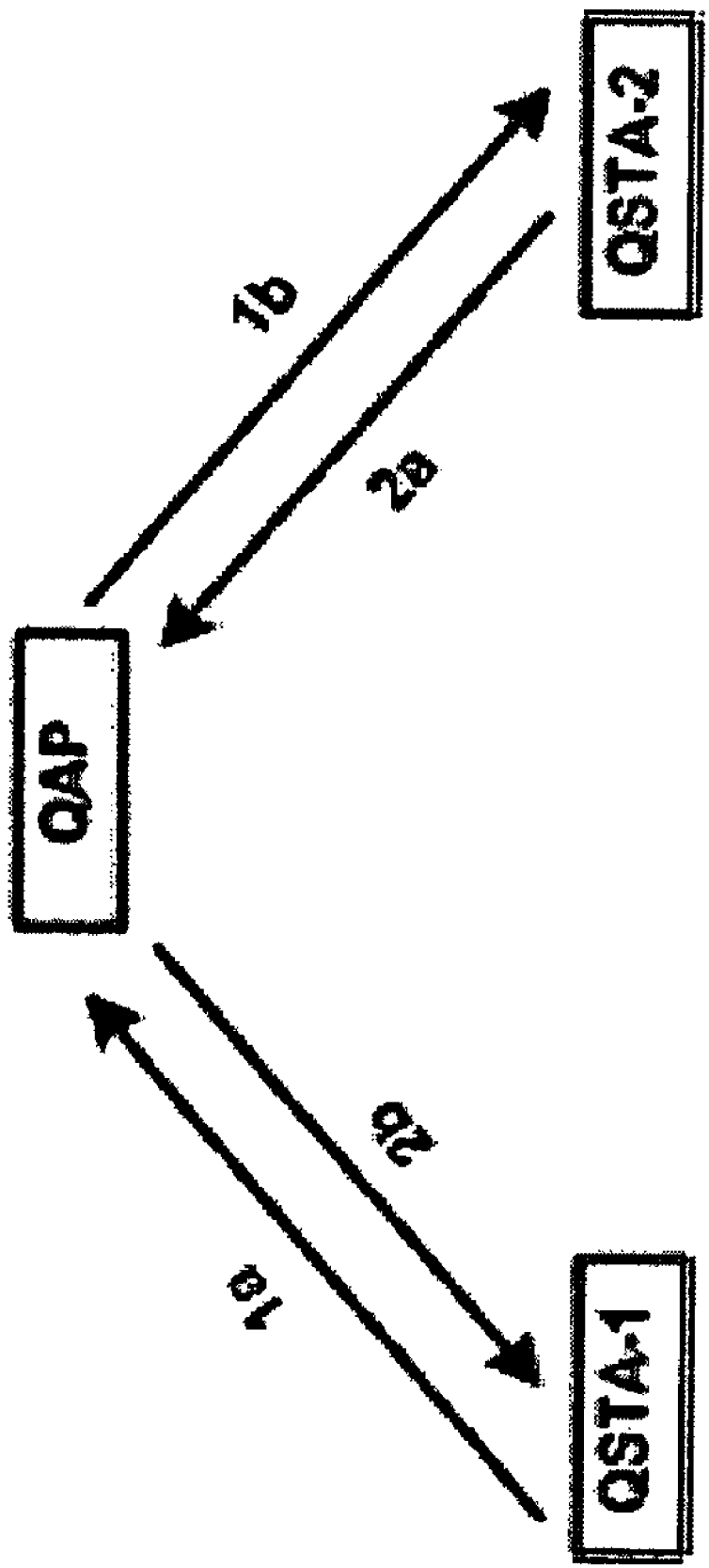
FIG. 1 shows a diagram of a conventional DLP handshake process, according to the aforementioned IEEE 802.11e standard.
Figure 2:
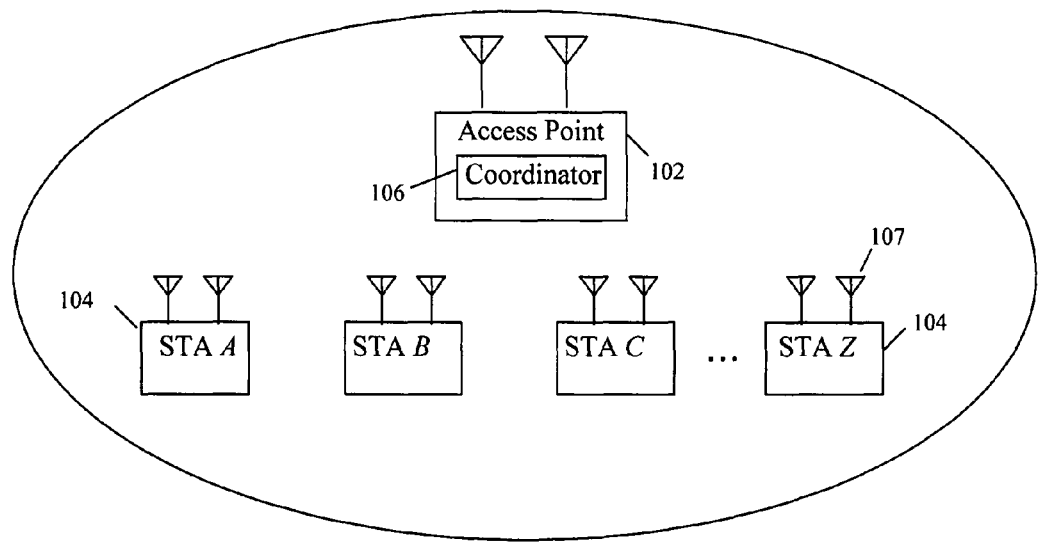
FIG. 2 shows a functional block diagram of a wireless communication system implementing a subnet access method, according to an embodiment of the present invention.

FIG. 2 shows a functional block diagram of a wireless communication system 100 (e.g., a 60 GHz WPAN) implementing an example subnet access process, according to the present invention. The system 100 includes an access point (AP) 102 and multiple stations (STA A, ..., STA Z) 104. The AP implements a coordinator 106. Although the coordinator 106 is shown as implemented in the AP 102 in FIG. 2, the coordinator 106 can also be implemented in one or more other device in the system 100. Further, the coordinator 106 can be implemented as a standalone module apart from the AP 102.

In many wireless communication systems, a frame structure is used for data transmission between wireless stations such as a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

The AP 102 implements a MAC layer on top of a PHY layer for wireless communication. The AP 102 provides central coordination for the stations 104. The AP 102 and stations 104 normally communicate on said primary frequency channel. The coordinator 106 implements a subnet access process according to the present invention, which establishes and manages said secondary frequency channel as necessary.

Figure 3:
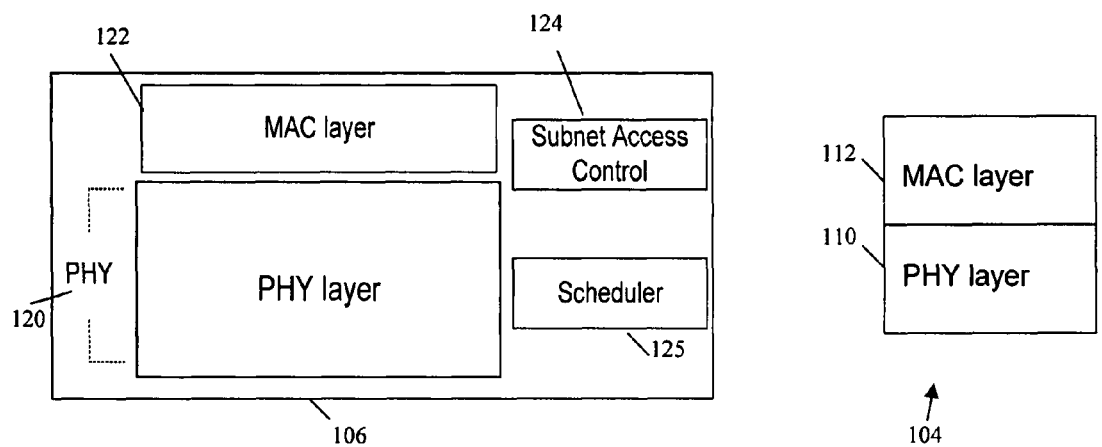
FIG. 3 shows the protocol architecture for a station and a coordinator including a subnet access controller, according to an embodiment of the present invention.

FIG. 3 shows protocol architecture for each station 104 in the system of FIG. 2. Each station 104 includes a PHY layer 110 and a MAC layer 112. FIG. 3 also shows an example protocol architecture for the coordinator 106, including a PHY layer 120, a MAC layer 122 and a subnet access control module 124 implementing a subnet access process according to the present invention. The PHY layers 110 and 120 implement radio frequency (RF) communication for transmit/receive signals.

If due to insufficient available bandwidth on the primary frequency channel, a new transmission request between a pair of stations (e.g., requesting STA A and STA B in FIG. 2) cannot be satisfied, the coordinator 106 establishes a subnet comprising a direct link on a secondary frequency channel, such that the pair of requesting stations can access the secondary channel for communication therebetween. As such, the coordinator 106 starts a subnet (or a direct link) so that the pair of requesting stations can be admitted and allocated a contention-free data period on the secondary channel for communication therebetween.

Figure 4:
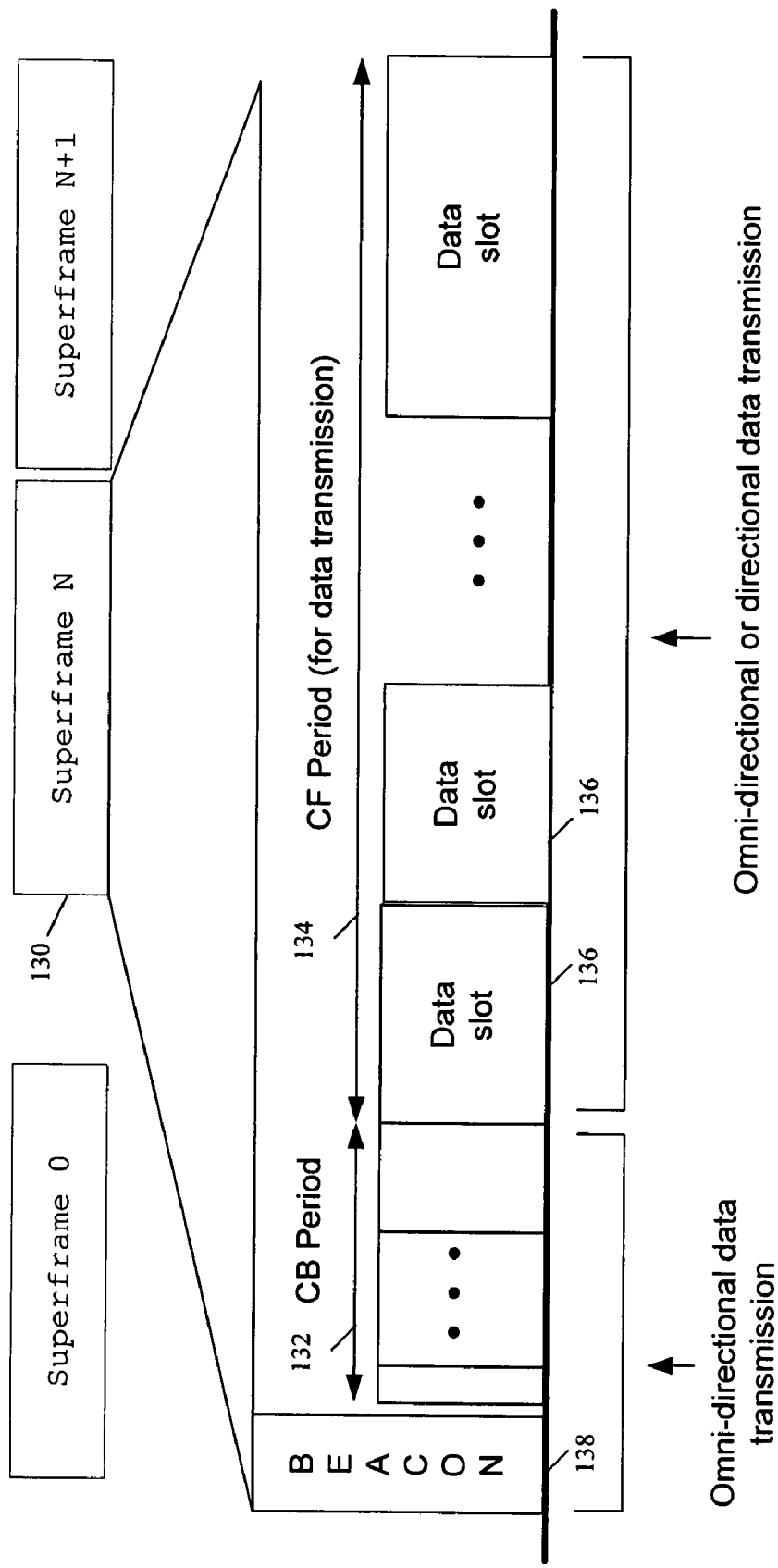
FIG. 4 shows an example superframe structure for wireless communication over a shared channel by the stations in FIG. 2.

FIG. 4 shows multiple superframe structures 130 for wireless communication over a shared channel (such as the primary or secondary frequency channel) by the stations in FIG. 2, according to an embodiment of the present invention. In each superframe structure 130, a contention-based (CB) channel time period 132 is used for transmission of control messages, and a contention-free (CF) channel time period 134 is used for transmission of asynchronous or isochronous data during scheduled slots 136.

The coordinator 106 includes a scheduler 125 that is responsible for managing the CB and CF periods 132 and 134, respectively, wherein a CB period 132 and a CF period 134 form a superframe 130. FIG. 4 illustrates multiple superframes 130 (superframe 0, ..., superframe N+1). The coordinator 106 periodically transmits a beacon frame 138 (omni-directionally) on the primary channel to disseminate various timing information such as CF and CP control periods, CF data periods, time synchronization, etc., to the stations. Each superframe begins subsequent to a beacon frame 138.

Figure 5:
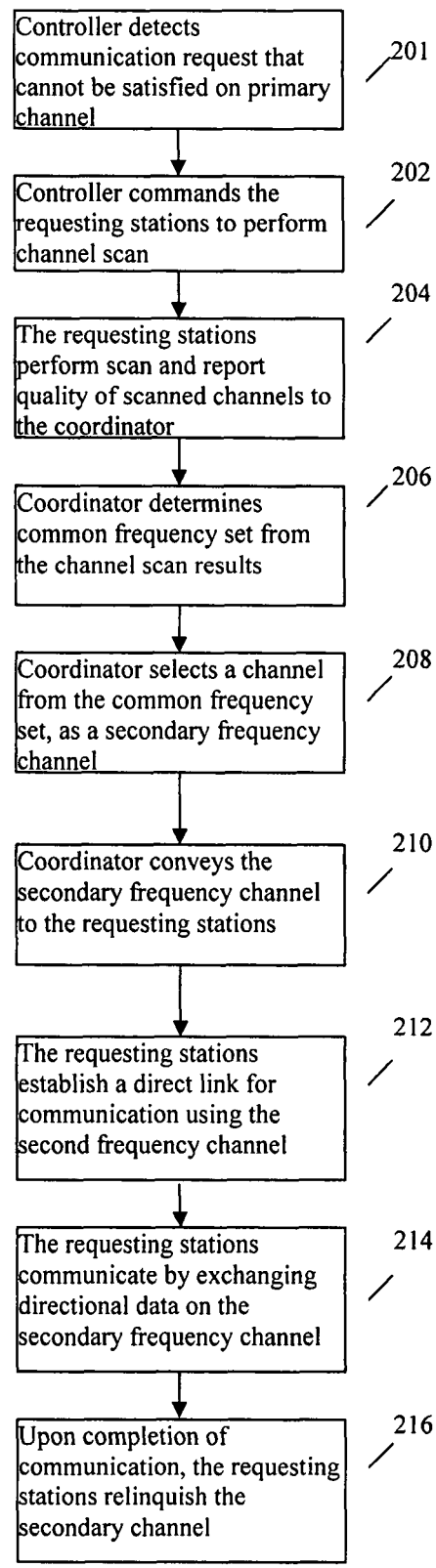
FIG. 5 shows a flowchart of the steps of a subnet access process implemented by the system of FIG. 2, according to an embodiment of the present invention.

FIG. 5 shows a flowchart of the steps of an example subnet access process 200 involving the coordinator 106 (e.g., coordinator C) and two stations 104 (e.g., stations A and B), for establishing a secondary frequency channel between the two stations, according to an embodiment of the present invention. The process 200 includes the following steps:

Step 201: The coordinator C detects that a new request for communication between stations A and B on the primary frequency channel cannot be satisfied because the requested bandwidth exceeds the available bandwidth on the primary frequency channel. The new request cannot be admitted on the primary frequency channel, whereby the coordinator C invokes establishment of a secondary channel (i.e., a subnet or a direct link) for the stations A and B to satisfy the new request.

Figure 6:
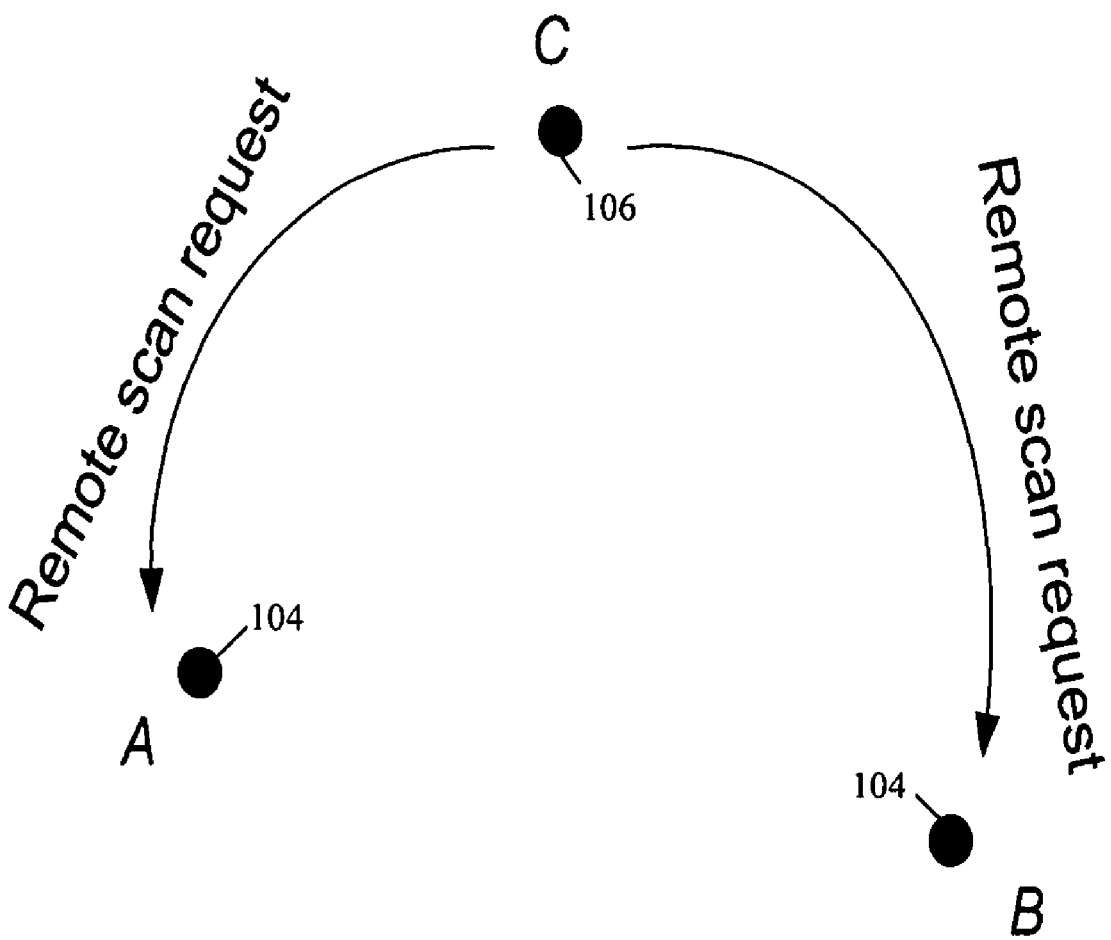
FIG. 6 shows a diagrammatical example of issuing a remote scan command from a subnet access controller to requesting stations for establishing a subnet (direct link) over a secondary frequency between the requesting stations, according to the present invention.

Step 202: Since the coordinator C can be busy receiving or transmitting data, or managing the primary channel, the coordinator C commands/requests that the stations A and B perform a remote scan (FIG. 6), and report back the scan results to the coordinator. The remote scan command can be similar to that described in the IEEE 802.15.3 specifications, such as IEEE 802.15.3 Working Group. Part 15.3: Wireless medium access control (MAC) and physical layer (PHY) specifications for high rate wireless personal area networks (WPAN).

Figure 7:
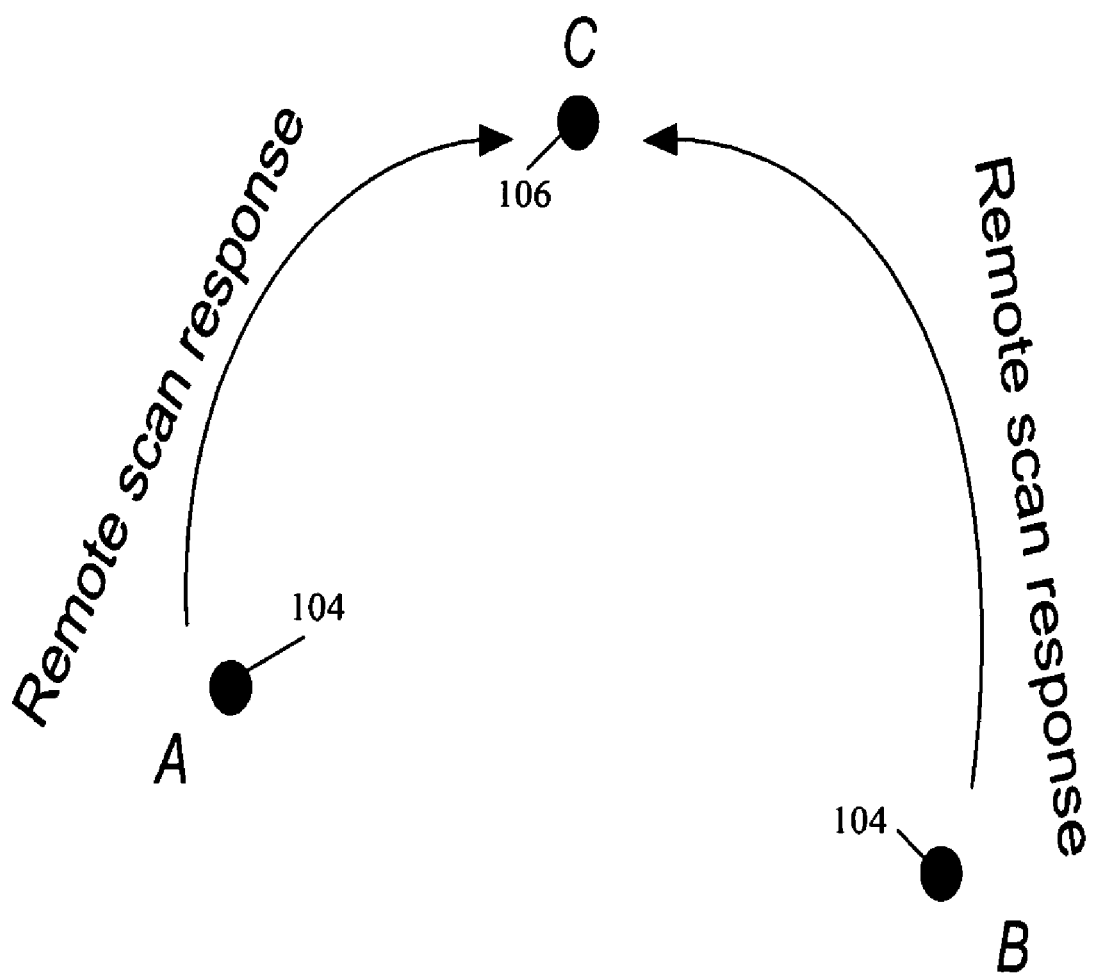
FIG. 7 shows a diagrammatical example of a remote scan response from the requesting stations to the subnet access controller for establishing the subnet (direct link) between the requesting stations, according to the present invention.

Step 204: Each of the stations A and B performs a remote channel scan (FIG. 7) and reports back the remote scan results to the coordinator C using the remote scan response commands such as in said IEEE 802.15.3 specifications. The two remote scan results include the channels scanned by each of the stations A and B and the quality of the scanned channels.

Step 206: The coordinator C determines a common frequency channel set based on the two remote channel scan results from the stations A and B. In one example, the common frequency channel set includes frequencies of similar scanned quality for both stations A and B.

Step 208: The coordinator C selects a frequency channel from the common frequency set as a secondary frequency channel. If more than one common frequency is determined in the frequency set, then the coordinator C selects the one with the highest channel quality as the secondary frequency channel.

Step 210: The coordinator C conveys information about the secondary frequency channel to the stations A and B.

Figure 8:
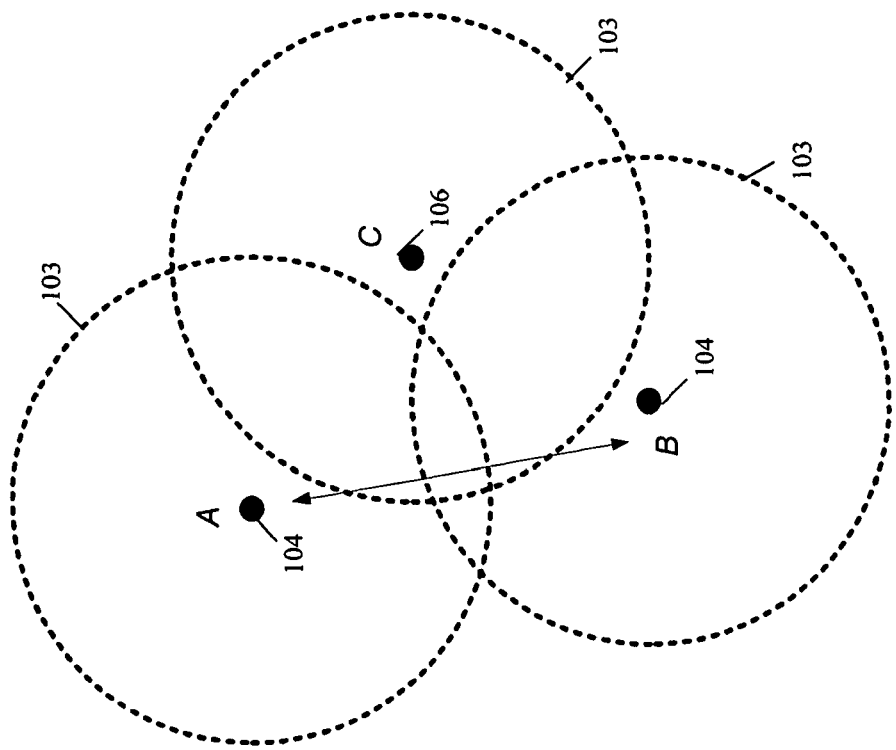

Step 212: For establishing a subnet comprising a direct link between the stations A and B, the stations A and B exchange Probe request-and-response commands on the selected secondary channel in omni-directional mode as shown by example in FIG. 8. The Probe commands can be similar to that described in said IEEE 802.15.3 specifications. The perimeters 103 shown around the stations A, B, and the controller C, reflect their omni-directional transmission range. The station initiating a direct link setup (e.g., station A) sends a Probe request command and the peer station (e.g., station B) responds with a Probe response command. The Probes are exchanged to ensure that the two stations A and B are within range and successfully communicate on the secondary channel. After successfully exchanging the Probes, the two stations A and B have successfully established a direct link on the selected secondary channel.

Figure 9:
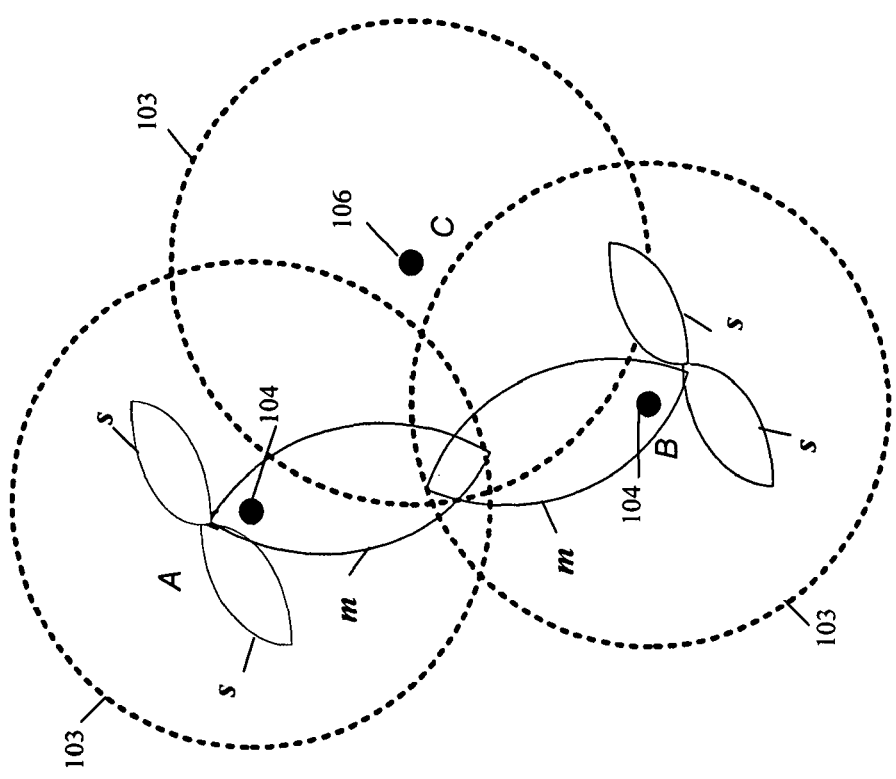
FIGS. 8 and 9 show examples of establishing a subnet providing a direct link for peer-to-peer, directional or omni-directional, communication over the secondary frequency channel between the requesting stations, according to an embodiment of the present invention.

Step 214: The coordinator C assigns schedules (CF periods 134) on the secondary channel, as communicated in a beacon frame 138. Then, the stations A and B wirelessly exchange directional data via directional beams on the secondary frequency channel as shown by example in FIG. 9, wherein each directional beam comprises a main lobe m and one or more side lobes s.

Step 216: Upon completion of the directional communication, the stations A and B relinquish the secondary frequency channel, and the coordinator C terminates the direct link.

As such, the coordinator C invokes establishment of a subnet for the stations A and B when the coordinator C determines that a new request for communication between the stations A and B cannot be satisfied on the primary frequency channel. The stations A and B communicate on the subnet (i.e., the direct link) by exchanging directional data therebetween, without needing a third device such as the coordinator.

Figure 10:
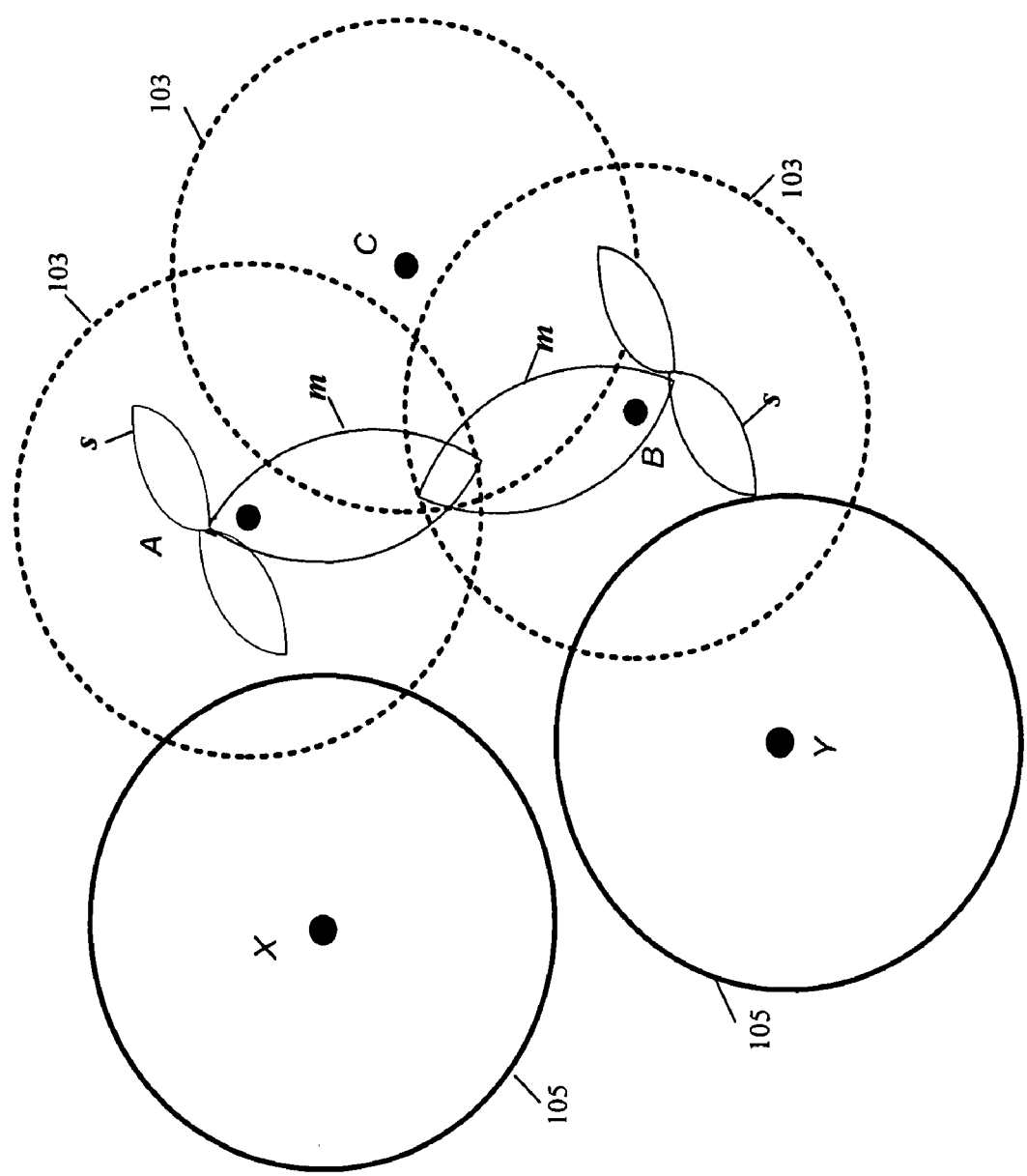
FIG. 10 shows an example of stations that do not detect directional transmissions on a secondary frequency channel and interpret the channel as free for transmission, causing interference with transmission on the secondary frequency channel.
Figure 11:
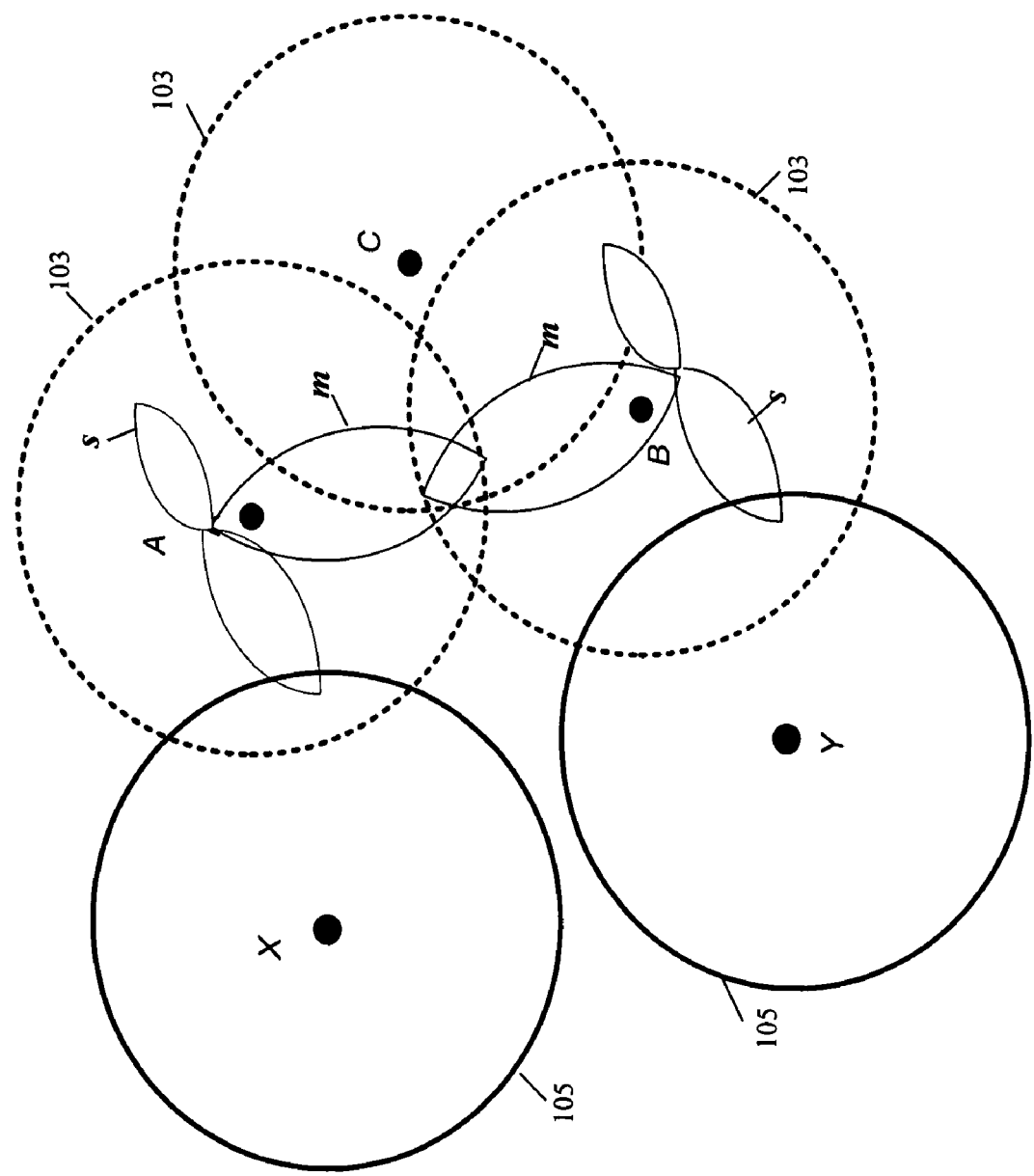
FIG. 11 shows an example where the interfering stations detect transmission on the secondary frequency channel.

Referring to the example in FIG. 10, because data exchange on the secondary frequency channel between the stations A and B is directional, another station (e.g., a station X associated with another coordinator, or a station Y wishing to start a new personal area network or piconet), may mistakenly interpret that the secondary frequency channel is free (or available for use). This is because directional beams comprising main lobes m and side lobes s, from the stations A and B are very dynamic. It is possible that at one instant in time, the stations X or Y do not observe/detect directional beam signal energy from main and side lobes of stations A and B, as shown by the perimeters 105 in FIG. 10 reflecting the wireless sensitivity range of the stations X and Y. While stations A and B are exchanging data, stations X or Y may mistakenly interpret the secondary channel to be free for transmission, and interfere with the ongoing transmissions between stations A and B (i.e., causing collisions). However, as shown by example in FIG. 11, some time later, stations X and Y may receive signal energy from the main and/or side lobes of directional beams from stations A and/or B, and therefore, may create interference with the ongoing directional transmission between the stations A and B.

According to the present invention, to reduce such possibility, in one example either of stations A or B can periodically broadcast NULL frames for a fixed duration on the secondary frequency channel, for as long as stations A and B remain active (communicate) on the secondary frequency channel. When peer-to-peer stations A and B with direct link on the secondary channel have no further data to exchange, the stations A and B switch back to communicate on the primary frequency channel, and stop broadcasting NULL frames. At this point the coordinator terminates the subnet, relinquishing the secondary frequency channel.

Figure 12:
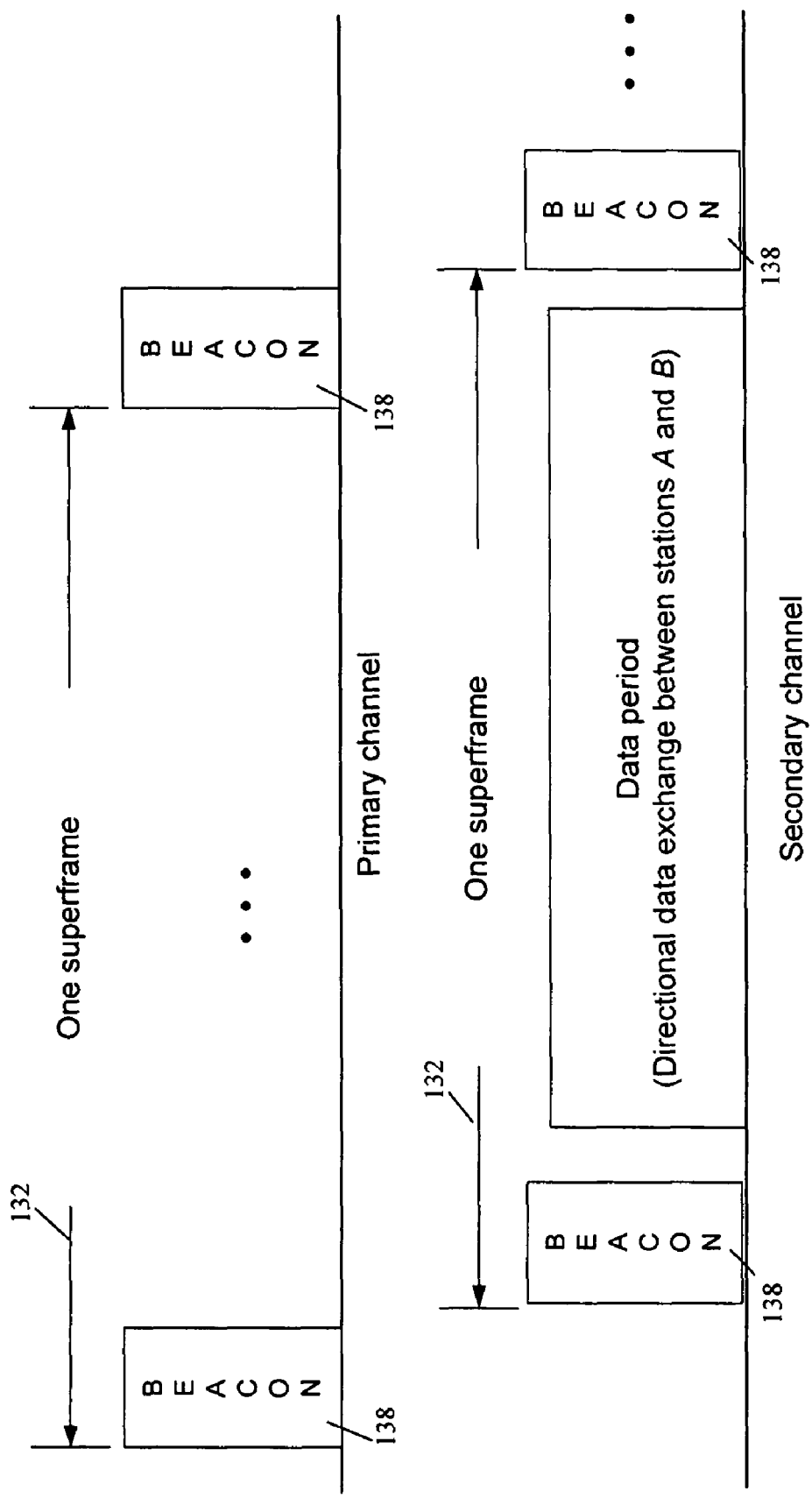
FIG. 12 shows an example of protecting against interference by other stations, by using a duplicate beacon on the secondary channel, according to an embodiment of the present invention.

In another example, the coordinator C on the primary frequency channel transmits duplicates of the primary channel beacon 138 on the secondary frequency channel 138 as shown in the example timing diagram of FIG. 12. When peer-to-peer stations A and B with direct link on the secondary channel have no further data to exchange, the stations A and B switch back to communicate on the primary frequency channel, and the coordinator stops duplicating beacons on the secondary frequency channel. At this point the coordinator terminates the subnet, relinquishing the secondary frequency channel.

Using a subnet access method to provide a direct link between stations on a secondary frequency for peer-to-peer communication according to the present invention, allows more stations to be admitted in an existing wireless network such as a personal area network (PAN). Further, quality of service is improved since without a secondary channel such peer-to-peer transmissions could not occur.

In one example, the system 100 (FIG. 2) allows uncompressed video transmissions via the secondary frequency channel over a 60 GHz band millimeter-wave (mmwave) technology to support a PHY layer data of 3-4 gigabits per second (Gbps), such as transmitting uncompressed HDTV signals wirelessly. The system 100 utilizes multiple antennas 107 for directional transmission beams for transmitting/receiving HD data.

Figure 13:
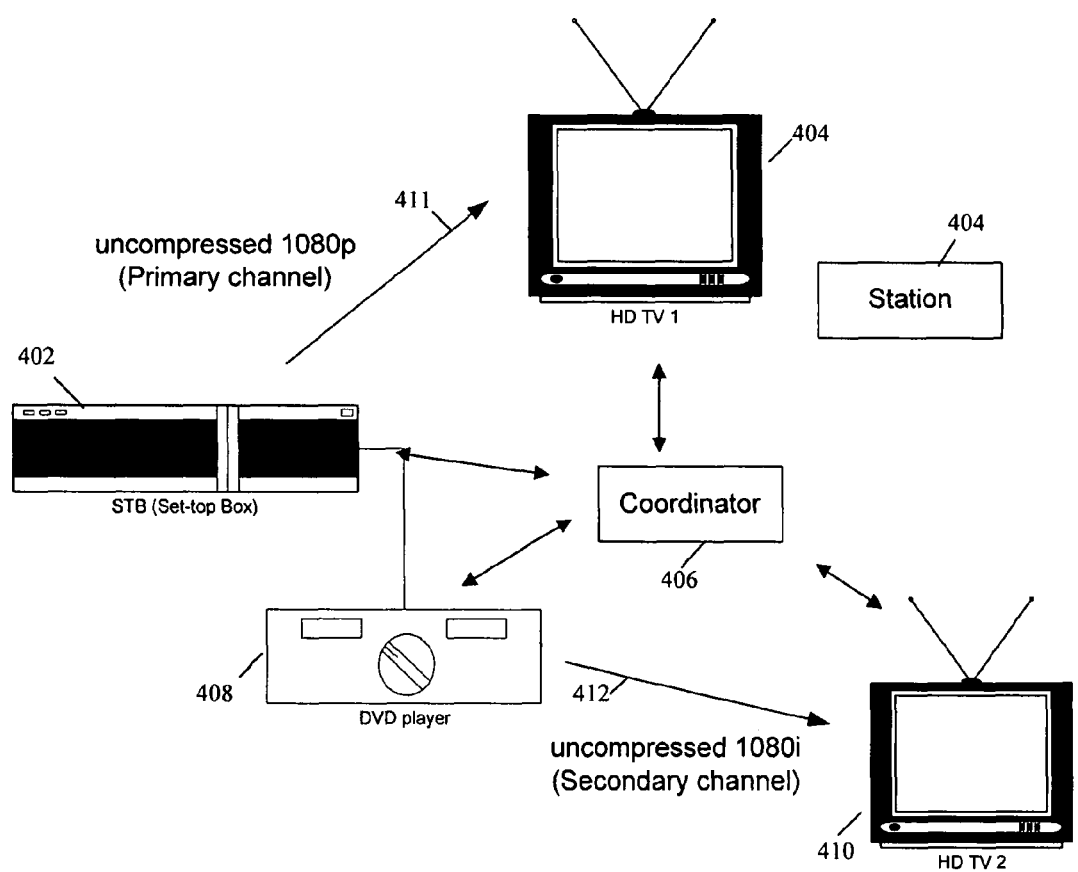
FIG. 13 shows a functional block diagram of another wireless communication system implementing a subnet access method, according to another embodiment of the present invention.

FIG. 13 shows an example wireless network 400 implementing a subnet access process according to an embodiment of the present invention, wherein in one scenario a set-top box (STB) 402 is transmitting uncompressed HD video (e.g., 1080p) to one or more currently active stations 404 (e.g., HD TV 1) over a primary channel, while a coordinator 406 receives a new request for wireless data communication between a pair of requesting stations 408 and 410. The pair of requesting stations 408 and 410 can be, e.g., a media server such as a DVD player requesting to record DVD content to a personal video recorder (PVR), or transmit uncompressed HD video (e.g., 1080i) for display on another HD TV 1, HD TV 2.

Considering an 8-bit quantization and 60 frames/second, one second of uncompressed video (1080p RGB format) can be expressed as 60×3×8×1920×1080=2.98 Gbits and one second of uncompressed video (1080i RGB format) can be expressed as 30×3×8×1920×1080=1.492 Gbits. Thus, to support both 1080p and 1080i streams on the primary channel, a wireless link supporting at least 4.478 Gbps is required. Considering a 60 GHz wireless system which supports a PHY rate of 3.8 Gbps, once a 1080p stream is active on a primary frequency channel 411 between the STB 402 and the HD TV 1 404, there remains insufficient bandwidth on the primary frequency channel 411 to satisfy the request from the DVD player 408 to transmit uncompressed HD 1080i video stream to the HD TV 2 410.

Based on the subnet access process, the coordinator 406 establishes a subnet (or a direct link) 412 on a secondary frequency channel so that the DVD player 408 can transmit 1080i video stream DVD content to the HD TV 2 410 on the secondary frequency channel.

Although in the examples herein the secondary channel is an established transmission of video information, the present invention is equally useful in establishing a secondary channel for transmission of information in general (not limited to video information), regardless of whether the primary channel is used for transmission of video or other types of information.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless data communication, comprising:
    receiving a request for wireless communication between two wireless stations over a primary frequency channel;
    establishing a direct wireless communication link between the two stations over a secondary frequency channel;
    periodically transmitting a beacon on the primary channel to disseminate timing information about contention-free periods for transmission of data during scheduled slots; and
    performing wireless communication between the two stations via the direct communication link over the secondary frequency channel during the scheduled slots, wherein one or both of the two stations periodically broadcasting one or more NULL frames for fixed duration on the secondary frequency channel for preventing other stations from transmitting on the secondary channel, the one or more NULL frames and directional data are transmitted on the secondary frequency channel, and an access point (AP) or coordinator on the primary frequency channel transmits duplicates of the primary frequency channel beacon on the second frequency channel to prevent other stations from transmitting on the secondary frequency channel.

2. The method of claim 1 wherein establishing the direct communication link between the two stations further includes:
    determining if the primary frequency channel has sufficient bandwidth to satisfy the communication request; and
    if the primary frequency channel has insufficient bandwidth to satisfy the communication request, then establishing the direct communication link between the two stations over the secondary frequency channel.

3. The method of claim 2 wherein establishing the direct communication link between the two stations further includes:
    the two stations performing remote channel scans;
    based on the remote channel scans, determining a common frequency set; and
    selecting a frequency channel from the common frequency set as the secondary frequency channel.

4. The method of claim 3 wherein selecting a frequency channel from the common frequency set further includes selecting a frequency channel with the highest quality in the common frequency set.

5. The method of claim 3 wherein performing remote channel scans further includes:
    commanding each of the two stations to perform a remote channel scan; and
    each station performing a remote channel scan, and providing the scan results by a remote scan response command.

6. The method of claim 5 wherein the scan results include information about the channels scanned, and the quality of each scanned channel.

7. The method of claim 6 wherein performing communication between the two stations further includes performing directed beam peer-to-peer communication between the two stations via the direct communication link over the secondary frequency channel.

8. The method of claim 1 further including:
    terminating the direct link on the secondary frequency channel upon completion of communications between the two stations.

9. A coordinator for wireless communication system, comprising:
    a communication module configured to receive a request for wireless communication between a pair of wireless stations over a primary frequency channel;
    a subnet access control module configured to establish a direct wireless communication link between the two stations over a secondary frequency channel; and
    a scheduler configured to periodically transmit a beacon on the primary channel to disseminate timing information about contention-free periods for transmission of data during scheduled slots;
    wherein the pair of wireless stations communicate therebetween via the direct communication link over the secondary frequency channel during the scheduled slots, one or both of the two stations periodically broadcasting one or more NULL frames for fixed duration on the secondary frequency channel for preventing other stations from transmitting on the secondary channel, the one or more NULL frames and directional data are transmitted on the secondary frequency channel, and an access point (AP) or coordinator on the primary frequency channel transmits duplicates of the primary frequency channel beacon on the second frequency channel to prevent other stations from transmitting on the secondary frequency channel.

10. The coordinator of claim 9 wherein the subnet access control module is further configured to establish the direct communication between the two stations by first determining if the primary frequency channel has sufficient bandwidth to satisfy the communication request, such that if the primary frequency channel has insufficient bandwidth to satisfy the communication request, then the subnet access control module establishes the direct communication link between the two stations over a secondary frequency channel.

11. The coordinator of claim 10 wherein the subnet access control module is further configured to establish the direct communication link between the two stations by commanding that the two stations perform remote channel scans, and based on the results of the remote channel scans by the two stations, the subnet access control module determines a common frequency set and selects a frequency channel from the common frequency set as the secondary frequency channel.

12. The coordinator of claim 11 wherein the subnet access control module is configured to select a frequency channel from the common frequency set by selecting a frequency channel with the highest quality in the common frequency set.

13. The coordinator of claim 11 wherein each station performs a remote channel scan, and provides the scan results to the subnet access control module by a remote scan response command.

14. The coordinator of claim 13 wherein the scan results include information about the channels scanned, and the quality of each scanned channel.

15. The coordinator of claim 11 wherein the subnet access control module is further configured to convey the selected frequency channel to the two stations as the secondary frequency channel, for the two stations to begin directed beam peer-to-peer communication therebetween over the direct communication link via the secondary frequency channel.

16. The coordinator of claim 15, wherein the two stations perform directed beam peer-to-peer communication between the two stations via the direct communication link over the secondary frequency channel during the scheduled slots.

17. The coordinator of claim 9 wherein the subnet access control module is configured such that upon completion of communications between the two stations, the subnet access control module terminates the direct link on the secondary frequency channel.

18. The coordinator of claim 9 wherein the subnet access control module is further configured to transmit duplicates of a primary frequency channel beacon on the second frequency channel.

19. The coordinator of claim 9 wherein the wireless stations transmit uncompressed video data over the direct communication link via the secondary frequency channel.

20. A wireless communication system comprising:
a pair of wireless stations; and
a coordinator for establishing a connection on a secondary frequency channel for wireless communication, the coordinator comprising:
a communication module configured to receive a request for wireless communication between a pair of wireless stations over a primary frequency channel;
a subnet access control module configured to establish a direct wireless communication link between the two stations over a secondary frequency channel; and
a scheduler configured to periodically transmit a beacon on the primary frequency channel to disseminate timing information about contention-free periods for transmission of data during scheduled slots;
wherein the pair of wireless stations are configured to communicate therebetween via the direct communication link over the secondary frequency channel during the scheduled slots, wherein one or both of the pair of wireless stations periodically broadcasting one or more NULL frames for fixed duration on the secondary frequency channel for preventing other stations from transmitting on the secondary channel, the one or more NULL frames and directional data are transmitted on the secondary frequency channel, and an access point (AP) or the coordinator on the primary frequency channel transmits duplicates of the primary frequency channel beacon on the second frequency channel to prevent other stations from transmitting on the secondary frequency channel.

21. The system of claim 20 wherein the subnet access control module is further configured to establish the direct communication between the two stations by first determining if the primary frequency channel has sufficient bandwidth to satisfy the communication request, such that if the primary frequency channel has insufficient bandwidth to satisfy the communication request, then the subnet access control module establishes the direct communication link between the two stations over a secondary frequency channel.

22. The system of claim 21 wherein the subnet access control module is further configured to establish the direct communication link between the two stations by commanding that the two stations perform remote channel scans, and based on the results of the remote channel scans by the two stations, the subnet access control module determines a common frequency set and selects a frequency channel from the common frequency set as the secondary frequency channel.

23. The system of claim 22 wherein the subnet access control module is configured to select a frequency channel from the common frequency set by selecting a frequency channel with the highest quality in the common frequency set.

24. The system of claim 22 wherein each station is configured to perform a remote channel scan, and provides the scan results to the subnet access control module by a remote scan response command.

25. The system of claim 24 wherein the scan results include information about the channels scanned, and the quality of each scanned channel.

26. The system of claim 22 wherein the subnet access control module is further configured to convey the selected frequency channel to the two stations as the secondary frequency channel, for the two stations to begin directed beam peer-to-peer communication therebetween over the direct communication link via the secondary frequency channel.

27. The system of claim 26 wherein the two stations are configured to perform directed beam peer-to-peer communication between the two stations via the direct communication link over the secondary frequency channel during the scheduled slots.

28. The system of claim 20 wherein the subnet access control module is configured such that upon completion of communications between the two stations, the subnet access control module terminates the direct link on the secondary frequency channel.

29. The system of claim 20 wherein the subnet access control module is further configured to transmit duplicates of a primary frequency channel beacon on the second frequency channel.

30. The system of claim 20 wherein the wireless stations are configured to transmit uncompressed video data over the direct communication link via the secondary frequency channel.

31. A method of wireless data communication, comprising:
receiving a request for wireless communication between two wireless stations over a primary frequency channel;
establishing a direct wireless communication link between the two stations over a secondary frequency channel;
commanding each of the two stations to perform a remote channel scan and providing the scan results by a remote scan response command, wherein the scan results include information about the channels scanned, and the quality of each scanned channel;

based on the remote channel scans, determining a common frequency set;

selecting a frequency channel from the common frequency set as the secondary frequency channel;

periodically transmitting a beacon on the primary channel to disseminate timing information about contention-free periods for transmission of data during scheduled slots; and performing directed beam peer-to-peer wireless communication between the two stations via the direct communication link over the secondary frequency channel during the scheduled slots, wherein one or both of the two stations periodically broadcasting one or more NULL frames for fixed duration on the secondary frequency channel for preventing other stations from transmitting on the secondary channel, the one or more NULL frames and directional data are transmitted on the secondary frequency channel, and an access point (AP) or coordinator on the primary frequency channel transmits duplicates of the primary frequency channel beacon on the second frequency channel to prevent other stations from transmitting on the secondary frequency channel.

32. The method of claim 1, wherein the transmission data is uncompressed High Definition (HD) transmission data.

33. The method of claim 32, wherein the primary frequency channel beacon and NULL frame are transmitted on separate frequency channels.

* * * * *